July 24, 1962 K. A. ROBINSON ETAL 3,046,468
CONTROL SYSTEMS FOR GENERATORS
Filed June 22, 1959 2 Sheets-Sheet 1
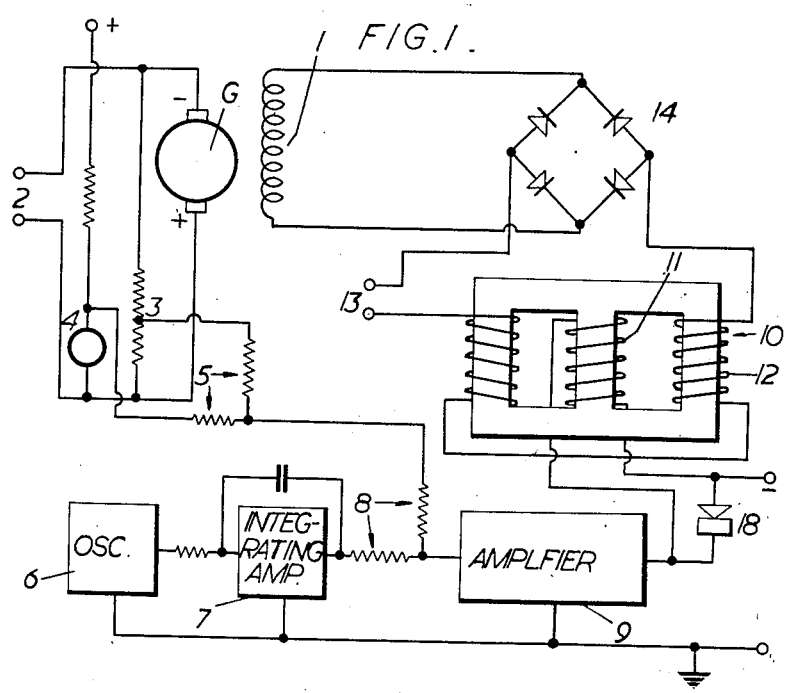
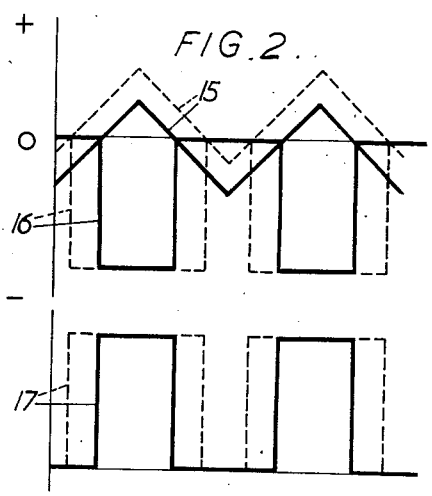
Inventors
Kenneth Arthur Robinson
William Henry Woodward
By
Dowell
Attorneys # United States Patent Office 3,046,468
Patented July 24, 1962

3,046,468
CONTROL SYSTEMS FOR GENERATORS
Kenneth Arthur Robinson, Etchinghill, near Rugeley, and William Henry Woodward, Weeping Cross, Stafford, England, assignors to Lancashire Dynamo Electronic Products Limited, Rugeley, England, a British company
Filed June 22, 1959, Ser. No. 821,842
1 Claim. (Cl. 322—28)

This invention relates to control systems such for example as speed regulators, voltage regulators and thermostatic regulators, in which a power output is controlled by an electrical control signal.

The use of amplifiers, particularly transistor amplifiers, in such systems is often difficult because of the considerable amount of power dissipation required in the amplifier itself to effect a desired regulation of power output.

According to the present invention, this difficulty is overcome by the use of a magnetic amplifier to control a power output by the effect of a variable saturating current controlled by an amplifier which is arranged to be switched from a low power output condition to a high power output condition and then from a high output condition to a low output condition at intervals so regulated as to control the power output by altering the relative durations of the periods of low and high power output of the amplifier. By this arrangement the effective power dissipation in the system is kept small because the output current of the amplifier is small during periods of low power output and the voltage drop through the amplifier is small during periods of high power output.

The magnetic amplifier may be composed of a single saturable reactor or it may have two or more stages. It is arranged to control the supply of power to a power-consuming device such as a motor or an electric heater under the control of an error voltage or other signal dependent upon the quantity to be controlled.

The invention will be fully understood from the following more detailed description of two examples of control systems embodying the invention, reference being made to the accompanying drawings in which:

FIGURE 1 is a schematic diagram of one control system,

FIGURE 2 is a graph illustrating the switching action of the system shown in FIGURE 2.

Figure 3:
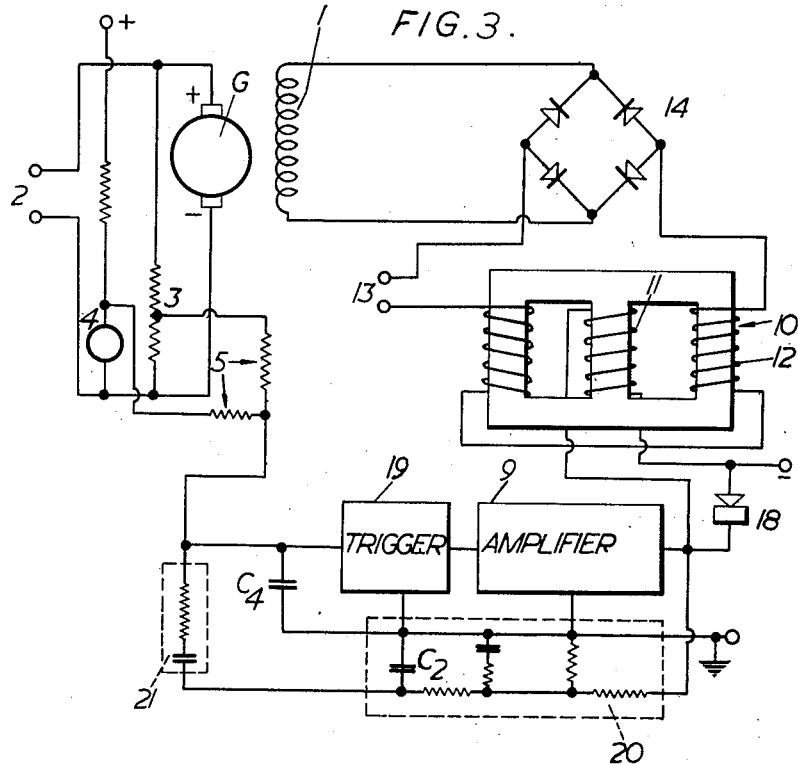
FIGURE 3 is a diagram similar to FIGURE 1 of a modified control system.

In the systems shown in FIGURES 1 and 2, G represents a D.C. generator having an exciting winding 1 the excitation of which is required to be automatically controlled so as to maintain a constant voltage across the output terminals 2 of the generator.

An "error" signal to be used for controlling the excitation is obtained by comparing the output voltage of a voltage-divider 3 connected across the generator G with a reference voltage of opposite polarity obtained from a reference source 4. The two voltages to be compared are applied to a summing network 5 so that an error signal representing the deviation of the system appears at the output of the summing network 5.

The device represented by the reference numeral 6 in FIGURE 1 is an oscillator designed to produce a square-wave output and 7 is an integrating amplifier which transforms the square-wave output of the oscillator into a "sweep" voltage of triangular or saw-tooth form. The sweep voltage so obtained forms one of two inputs fed to a summing network 8, the other input being the "error" voltage representing the deviation of the system supplied by the summing network 5. The summing network 8 is connected directly to the input of a transistor amplifier represented in the drawing by the box 9. The output of the transistor amplifier is fed to the input terminals of a magnetic amplifier in the form of a saturable reactor 10 having a saturating winding 11 and a reactance winding 12 connected to an A.C. power supply 13. The output of the magnetic amplifier feeds the exciting winding 1 through a rectifier 14.

The two inputs to the summing circuit 18 combine together therein so as to apply an input current to the transistor amplifier 9 in the form of a saw-tooth wave whose means value varies according to the value of the error signal. This input is represented in FIGURE 2 by the curves 15, the full-line curve showing the level of the input when the error signal is equal to zero whereas the broken line shows how the mean level of the input changes when the error signal rises to a positive value.

The amplitude of the input thus applied to the amplifier 9 in FIGURE 1 is made very large so that the input swings well above the level necessary to switch the amplifier to its maximum power output condition at one extremity of the sweep voltage and well below the level necessary to switch the amplifier to its minimum power output condition at the other extremity of the sweep voltage. The voltage output of the amplifier 9 thus assumes the square wave form represented by the curve 16 in FIGURE 2, the crests of these square waves occurring during "space" periods when the instantaneous value of the input to the amplifier 9 is negative, whereas the troughs occur during "mark" periods, when the instantaneous value of the input voltage is positive. The curve 17 in FIGURE 2 represents the corresponding current output for a non-inductive load and shows that the amplifier 9 is switched to its maximum power output condition when the input 15 swings positive and is switched to its minimum power output condition when the input 15 swings negative. As the saturating winding 11 is necessarily highly inductive, a rectifier 8 is connected across it to allow the magnetising current to flow round the rectifier circuit during the "space" periods.

As can be seen from FIGURE 2, when the error voltage is zero, the mark and space periods are of equal duration, so that the average value of the output current is equal to half the maximum value. If the error voltage rises above the zero axis, the duration of the mark intervals is increased relatively to the space intervals, so that the average value of the output current to the winding 11 is increased; and if the error voltage falls below the zero axis the average value of the output current to the winding 11 is correspondingly reduced. The value of the current in the winding 11 is thus controlled in accordance with the error voltage by the relative durations of the maximum and minimum values of the output of the transistor. The loop gain of the system will ordinarily be made so high that the error voltage tends to zero as will be readily understood.

FIGURE 3 of the drawing shows a modification of the arrangement shown in FIGURE 2 in which the separate oscillator 6 and integrating amplifier 7 of FIGURE 2 are omitted and in which the place of the summing circuit 8 is taken by an electronic switch 19 interposed between the summing network 5 and the amplifier 9. The electronic switch may consist of a transistor multi-vibrator or trigger circuit having an output which controls the input of the transistor amplifier 9. It is arranged to have two stable conditions, in one of which the output of the amplifier 9 is switched to its maximum value, whereas in the other condition the output is switched off or reduced to its minimum value, intermediate degrees of excitation of the winding 11 being obtained by variations in the relative durations of the two stable conditions of the trigger circuit.

The oscillations necessary to effect the periodic switching of the trigger circuit 19 are generated by the trigger circuit with the aid of a further feedback which proceeds from the winding 11 to the input of the trigger circuit, through an integrating circuit 20 and a coupling circuit 21.

Figure 4:
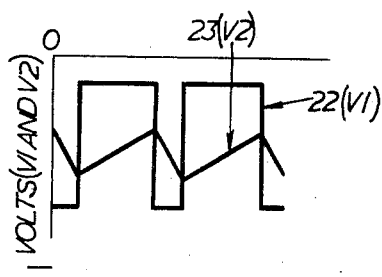
FIGURE 4 is a graph illustrating the feedback switching action of the system shown in FIGURE 3.

The integrating circuit 20 is designed so that its output approximates to the integral of the difference between the input voltage it receives from the winding 4 and the output voltage appearing across its output condenser C2. This output voltage therefore has a D.C. component proportional to the effective mean value of the coil excitation resulting from the relative durations of the mark periods when the output of the transistors T5 and T6 is switched to its maximum value, and the space periods when the transistor output is switched to its minimum value. It also has an alternating component which gives it its saw-tooth form. This is illustrated in FIGURE 4 of the drawings in which the rectangular wave 22 represents the input voltage $v1$ obtained from the amplifier 9 and the saw-tooth wave 23 represents the output voltage $v2$ appearing across the condenser C2. It will be noted that the voltage $v2$ increases during the mark periods at a rate proportional to the difference between the maximum value of the voltage $v1$ and the standing value of the voltage $v2$, and falls during the space periods at a rate proportional to the standing value of the voltage $v2$. This enables the fluctuations of the voltage $v2$ when communicated to the trigger circuit 16 to switch the trigger at intervals corresponding to the mark and space intervals of the rectangular wave 22 determined solely by the standing value of the voltage $v2$. The system is thus capable of maintaining the mean excitation of the field winding 4 at any level at which the deviation tends to zero. The "standing" value of the voltage $v2$ at any moment is the prevailing level of the D.C. component of that voltage, i.e. the mean value of voltage over a complete saw-tooth wave at any given moment. As in the arrangement shown in FIGURE 2, a rectifier 18 is connected across the winding 11 to allow the magnetising current to flow round the rectifier circuit during the periods when the output stage of the amplifier is cut off.

The coupling circuit 21 is designed to transmit the saw-tooth wave component of the voltage $v2$ with little or no distortion. However, at lower frequencies it responds to the rate of change of the D.C. level of the voltage $v2$ and thus introduces a control action which limits the rate of increase or decrease of the effective field excitation which results from a positive or negative "error" signal. The gain round the loop which includes the feedback from the winding 9 to the point 7 is made sufficiently high to ensure that the trigger circuit is switched at a sufficiently high frequency to obtain an effectively steady current in the winding 11 determined by the relative duration of the mark and space periods. The control loop including the feedback from the generator G to the transistor amplifier has a very high gain such that the error voltage tends to zero for any value of the current in the winding 11.

In the operation of the system shown in FIGURE 3, the generator G operates with a mean excitation determined by the standing value of the D.C. component of the voltage $v2$. When a positive or negative error signal occurs (owing for example to an increase or decrease in the output voltage of the generator G) the relative duration of the mark and space periods is automatically increased or diminished so as to produce an increase or decrease in the D.C. component of the voltage $v2$ in the sense to correct the error.

Since the coupling circuit 21 limits the rate of increase or decrease in the output voltage in accordance with the magnitude of the error signal but allows such increase or decrease to continue until the error signal disappears, its action can be described as in integral control action. The invention is not limited to this as various shaping circuits could be substituted for the circuit 19 to obtain desired control actions. However, the coupling circuit must conduct the saw-tooth wave component of the voltage $v2$ sufficiently well to maintain the system in oscillation at a sufficiently high freqnecy to avoid intermittent energisation effects in the winding 9.

A condenser C4 is connected across the input terminals of the trigger circuit in FIGURE 4 to prevent spurious oscillations.

We claim:

A control system comprising a magnetic amplifier having a saturating winding and a reactance winding arranged to control the supply of alternating current to a load circuit, a transistor amplifier having an input circuit and an output circuit containing said saturating winding, a trigger circuit coupled to the input of said transistor amplifier for switching the same either to a low power output condition or to a high power output condition, and a feedback path comprising an integrating circuit having input derived from the output of said transistor amplifier and an output approximating to the integral of the difference between the input of said integrating circuit and the output thereof, and a coupling circuit connected between the output of said integrating circuit and the input of said trigger circuit.

References Cited in the file of this patent

UNITED STATES PATENTS

| | | |
|---|---|---|
| 2,740,086 | Evans et al. | Mar. 27, 1956 |
| 2,854,614 | Light | Sept. 30, 1958 |
| 2,950,446 | Humez et al. | Aug. 23, 1960 |